(12) United States Patent
Chereshnev

(10) Patent No.: US 11,003,462 B2
(45) Date of Patent: May 11, 2021

(54) TOUCHED HOME

(71) Applicant: Evgeny Chereshnev, Moscow (RU)

(72) Inventor: Evgeny Chereshnev, Moscow (RU)

( * ) Notice: Subject to any disclaimer, the term of this patent is extended or adjusted under 35 U.S.C. 154(b) by 137 days.

(21) Appl. No.: 16/214,401

(22) Filed: Dec. 10, 2018

(65) Prior Publication Data
US 2019/0179651 A1 Jun. 13, 2019

Related U.S. Application Data

(60) Provisional application No. 62/596,949, filed on Dec. 11, 2017.

(51) Int. Cl.
G06F 9/44 (2018.01)
G06F 9/445 (2018.01)
G06K 7/10 (2006.01)

(52) U.S. Cl.
CPC ..... *G06F 9/44505* (2013.01); *G06K 7/10297* (2013.01); *G06K 7/10366* (2013.01)

(58) Field of Classification Search
CPC ..................................... G06F 1/32; G06F 9/44
See application file for complete search history.

(56) References Cited

U.S. PATENT DOCUMENTS

| | | | | |
|---|---|---|---|---|
| 2011/0145369 A1* | 6/2011 | Chen | ........................ | H04L 67/06 709/219 |
| 2013/0133055 A1* | 5/2013 | Ali | ........................ | G06F 21/32 726/7 |
| 2014/0053149 A1* | 2/2014 | Wu | ........................ | G06F 8/63 717/176 |
| 2014/0122140 A1* | 5/2014 | Rijnders | ................ | G06Q 30/01 705/7.13 |
| 2015/0029540 A1* | 1/2015 | Jo | ........................ | G06F 3/1236 358/1.15 |
| 2018/0335903 A1* | 11/2018 | Coffman | ................ | C08F 232/08 |

* cited by examiner

*Primary Examiner* — Keshab R Pandey

(57) ABSTRACT

The subject disclosure relates to employing automatically configuring a device based on a set of policies. In an aspect, disclosed is a system comprising an identification component that identifies a device requiring setup based on a set of identification data. In another aspect, the system includes a comparison component that compares the set of identification data to a set of reference data stored in a reference database. In yet another aspect, the system can include a transmission component that transmits a set of policy data to the device based on a subset of reference data determined to correspond to the device.

20 Claims, 5 Drawing Sheets

TOUCHED HOME

CROSS REFERENCE TO RELATED APPLICATION

This application claims priority to U.S. Patent Application No. 62/596,949, filed on Dec. 11, 2017 and titled, "Touched Home". The entirety of the disclosure of the aforementioned application is considered part of, and is incorporated by reference in, the disclosure of this application.

BACKGROUND

Traditionally, consumers whom purchase new products, devices, electronics, or other out of the box items must setup such item such that it is operable and ready for execution. Often this setup process can include performing software setup activities that require making software ready for execution. This setup process is tedious for a user in that they often must create an account, setup a Wi-Fi connection, setup payment account or wallet, select a country of origin, setup a preferred login mechanism (e.g., touch, facial recognition, password/passcode entry, etc.), setting up other services, establishing settings (e.g., for analytics, uses, etc.), and perform other setup activities.

Performing such setup tasks can become a nuisance to users in that it wastes time, effort, and comprises several redundant steps. Furthermore, many of the setup processes require a user to complete extra steps that increase the time required to use and enjoy the device for its intended purpose. Accordingly, innovations, technologies and solutions are needed to overcome such issues existent with setup processes for products, devices, electronics, or other out of the box items

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein are systems, devices, apparatuses, computer program products and/or computer-implemented methods that employ automated setup tasks associated with devices.

According to an embodiment, a system is provided. The system comprises a processor that executes computer executable components stored in memory. The computer executable components comprise an identification component that identifies a device requiring setup based on a set of identification data. In another aspect, the computer executable components comprise a comparison component that compares the set of identification data to a set of reference data stored in a reference database. In yet another aspect, the computer executable components comprise a transmission component that transmits a set of policy data to the device based on a subset of reference data determined to correspond to the device.

In addition, an appendix submitted herewith relates to various embodiments and/or features associated with the disclosed subject matter, and this appendix is considered part of this patent specification.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In an aspect, disclosed herein are devices, systems, and methods for facilitating a setup of a device. In an aspect, systems disclosed herein can be employed by a device the can access a series of data related to a user. Furthermore, the device can comprise a digital DNA (further disclosed in patent application No. 62/545,513) of a user that can include a secure record of a user's transactions and activities corresponding to real-time biometric data and statistical data of respective users. In an aspect, the dDNA represents a multi factor-identification and authorization tool belonging to a user and capable of use as a secure system and device to prove a respective person's identity at any time and any place. As such, the systems disclosed herein can also be employed within such device and furthermore, the systems (e.g., system 100) employed on such device can facilitate setup operations of other devices owned by a user.

Figure 1:
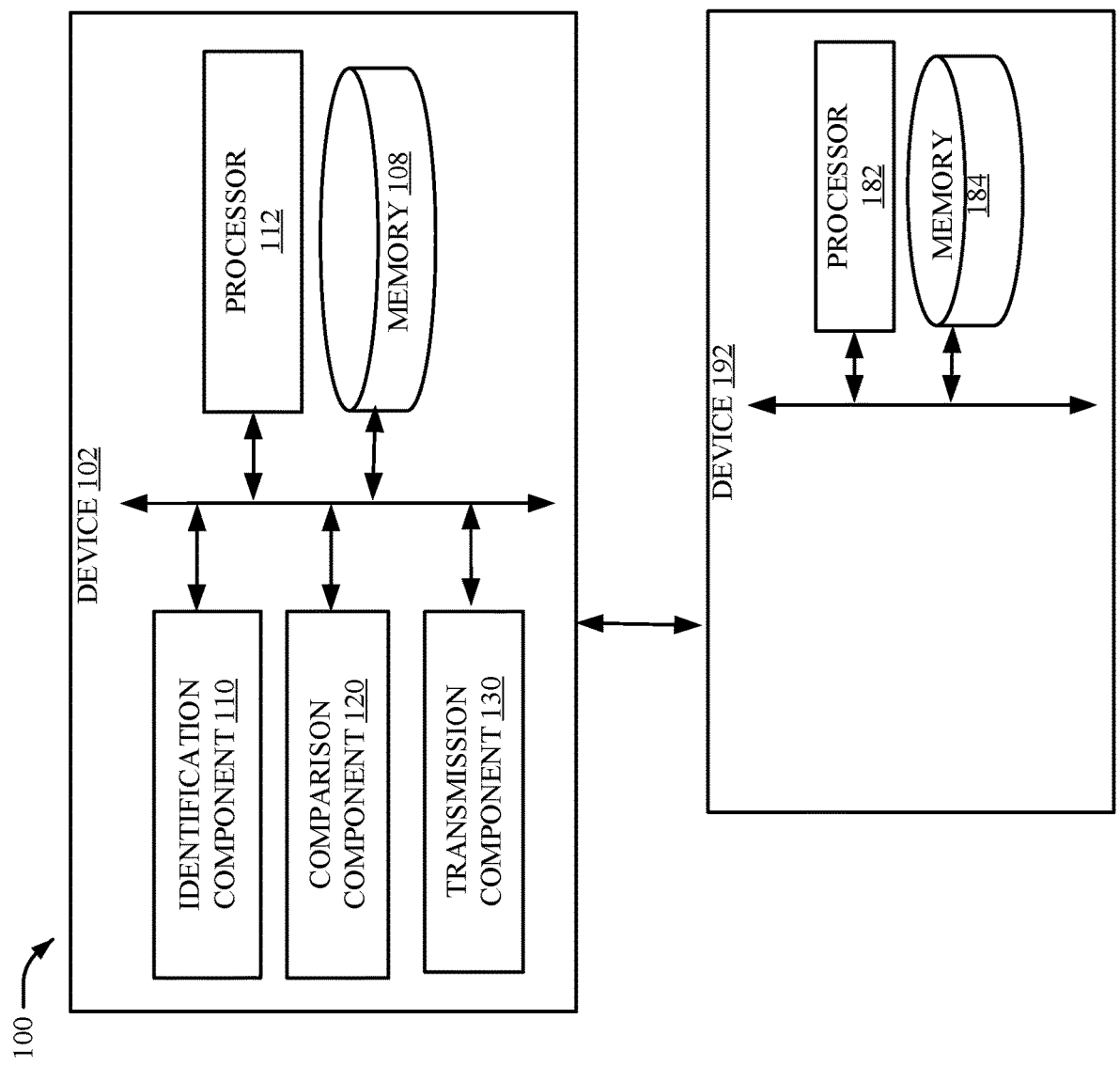
FIG. 1 illustrates a block diagram of an example, non-limiting system 100 that can facilitate a setup of a device in accordance with one or more embodiments described herein.

FIG. 1 illustrates a block diagram of an example, non-limiting system 100 that can facilitate a setup of a device in accordance with one or more embodiments described herein. In an aspect, system 100 can include a memory 108 that stores computer executable components and a processor 112 that executes the computer executable components stored in the memory 108. In an aspect, the computer executable components of system 100 can comprise an identification component 110 that identifies a device requiring setup based on a set of identification data. In another aspect, system 100 can comprise a comparison component that compares the set of identification data to a set of reference data stored in a reference database. In yet another aspect, system 100 can comprise a transmission component 130 that transmits a set of policy data to the device based on a subset of reference data determined to correspond to the device.

In an aspect, device 102 can be any of a range of devices (e.g., smart phone, tablet, desktop computer, set-top box, etc.), and in a non-limiting example embodiment, device 102 can be a wearable digital device (e.g., a wrist-mountable bracelet or watch) such as a device capable of generating a digital DNA (also referred to as dDNA). In an aspect, device 102 can utilize system 100, such that the computer-executable software components of system 100 can be stored in memory 108 of device 102. Furthermore, device 102 can comprise processor 112 that executes instructions associated with the components stored in memory 108. In an aspect, processor 112 can execute identification component 110 to identify a device 192 requiring setup based on a set of identification data. In an instance, system 100 enables a user to automatically setup out of the box devices such as electrical, mechanical, digital or other devices that require setting up.

For instance, a user that purchases a new smart television must perform a setup procedure to establish a new user account, set up the Wi-Fi settings, establish a payment link, and setup device specific protocols or settings. In an aspect, system 100 can facilitate this setup process by allowing device 102 (e.g., wearable bracelet) to automatically setup device 192 (e.g., a device requiring setup such as a television, pager, consumer electronic device, electromechanical device, etc.). In an instance, system 100 can allow device 102 to act as a master device and device 192 to become a slave or subordinated device to device 102. In a non-limiting embodiment, system 100 employed on device 102 can execute (e.g., using processor 112) identification component 110 to identify device 192. In a non-limiting embodiment, the identification can occur based on a touch or tapping between device 102 and device 192 or device 102 coming into a proximal range of device 192.

Furthermore, in a non-limiting embodiment, identification component 110 can employ a near-field communication (NFC) technology or a radio frequency identification (RFID) technology to facilitate the identification of device 192 by device 102. For instance, device 192 can comprise an RFID tag and device 102 can comprise an RFID reader. In an aspect, system 100 employed on device 102 can retrieve information (e.g., product information, manufacturer information, setup requirements, etc.) stored on the RFID tag to facilitate identification of the device. In another instance, device 102 can utilize NFC technology (e.g., employ an NFC chip) to detect device 102 and enable device 102 to communicate with device 192 and transmit data between devices.

In another aspect, system 100 can employ a comparison component 120 that compares the set of identification data to a set of reference data stored at memory 108 (e.g., at a database or data store within memory 108). In an aspect, the reference database can be an encrypted data store comprising categorized information associated with a range of devices. For instance, the set of identification data (e.g., identified by identification component 110) can indicate that device 192 is a television. As such, processor 112 of device 102 can perform classification, categorization, and or identification operations with respect to subordinate device 192. By performing, such classification and operations on device 102 and not by accessing resources from a network of servers, device 102 can execute classification tasks and setup tasks of subordinate device 192 and other such subordinate devices efficiently and faster than server-based processing activities. Furthermore, device 102 (e.g., dDNA device) can be configured as an encrypted container that encrypts one or more disk (e.g., full disk encryptio) and/or hardware storage component of device 102. In another aspect, device 102 can also transmit and/or receive file encryption data (e.g., to/from device 192), perform end-to-end encryption, encrypt web connections, encrypt servers (e.g., in embodiments where data is accessed from servers, for instance for data updates, policy data gathering tasks, etc.). In an embodiment, the encryption of data transmitted between device 102 and device 192 can be decrypted using a private key mechanism. In one or more other embodiments, the encryption of data and decryption of data by device 102 and device 192 can employ any one or more of secret-key algorithms, public-key algorithms, block cipher technoly, stream ciphers, elliptic curve cryptography, and/or blockchain cryptography.

Accordingly, comparison component 120 can compare the television information (e.g., size of television, type of television, resolution, brand, operating system, software type, etc.) and compare such information to a reference list of products and associated information as well as policies. As such, comparison component 120 can facilitate an identification of the type of product and type of configurations to employ within device 192 based on a similarity of identification information to reference information. Furthermore, in an aspect, the similarity of identification information to reference information can be represented by a data value and such data value can be within a threshold range of acceptable data values in order to determine that the identification information is sufficiently similar to the reference information. For instance, in an aspect, if the similarity data value is within the threshold range of data values then the identification information and reference information can be deemed similar, however, if the similarity data value is greater than or less than the threshold range of data values then the identification information and reference information can be deemed to be not similar.

In the event that comparison component 120 determines a similarity exists between the identification information and reference information, then system 100 can execute (e.g., using processor 112) a transmission component 130 that transmits a set of policy data from a master device 102 to the subordinate device 192 based on the similarity between the set of reference data to the set of identification data. As such, the reference information can correspond to a set of policy data. The policy data can determine who has a right to access the device 192 and on what terms such user can access device 192. In a non-limiting embodiment, device 192 can accept device 102 (e.g., master device) as the owner of device 192 and correspondingly have rights to configure the software associated with device 192 as well as adjust settings on device 192. Furthermore, upon device 192 accepting device 102 as the master device, the master device 102 can assign permissive use rights and configuration rights to other users with respect to access to and use of device 192.

In an aspect, system 100 can transmit a set of policy data to device 192 to facilitate setup and configuration of device 192. As such, a subset of policy data can represent that device 102 is the master and owner of device 192 and can configure device 192 with a set of policies and preferences in accordance to the device 102 preferences. For instance, a preference implemented on device 192 can include device 102 as the master account (e.g., a master source of policies for implementation into device 192), but several other devices are granted sub-accounts with authorized rights and privileges (e.g., family member accounts). In an instance, the beginning stages of setup of device 192 can include basic setup policies (e.g., brightness, Wi-Fi preferences, settings, credit card pairing, application preferences, browser preferences, etc.). However, as a user uses device 192, device 102 can implement new policies or adjust policies associated with device 192 in order for device 192 to be configured for optimal use by the user.

In an aspect, the set of policy data can represent several types of policies including, best practice policies, artificial intelligence generated policies, or user generated or user selected policies. In an instance, best practices policies can include policies or procedures that are accepted as being correct or most effective. For instance, in setting up a new mobile device a user may be granted an option to utilize a single passcode for device access or a double verification mechanism. In an aspect, system 100 can transmit a policy that automatically configures the mobile device to employ a double verification mechanism in accordance with best practices. Furthermore, system 100 can implement the passcode and password access codes as well to satisfy the setup requirement. In another aspect, system 100 can employ a digital DNA identity mechanism in lieu of a password requirement. Regardless, system 100 is capable of transmitting a best practice policy that can facilitate device 192 setup based on commonly accepted or prescribed procedures.

In another aspect, the set of policy data can be represented by a set of artificial intelligence generated policies. For instance, a neural network associated with system 100 can learn from the environment and facilitate a generation of policies to implement within device 192 based on patterns associated with a user's use, behaviors, and tasks associated with device 192. For instance, if a user consistently turns on closed captioning when tuning into a particular channel on a smart television, system 100 can generate via artificial intelligence, a policy that configures device 192 to automatically employ closed captioning when a user tunes into the particular channel. Accordingly, a subset of policy data can represent policies generated based on a users' patterns, behaviors and preferences in association with device 192.

In yet another aspect, a subset of policy data can represent user generated policies. Accordingly, a user can select policies for system 100 to implement into device 192 (from device 102) from a list of policies. For instance, policies can be listed online based on popularity or other policies can be crowdsourced or trending and be presented for selection by a user. Accordingly, a user can select a policy from a policy menu and device 102 can employ system 100 (e.g., transmission component 130) to transmit the selected policy data to device 192. As such, system 100 can identify a device 192 for setup and configuration as well as attachment of a user device 102 as a master of device 192. Furthermore, a user can populate device 192 with policies in an automated fashion such that device 192 operates in accordance with tailored policies to the master device 102 satisfaction.

Figure 2:
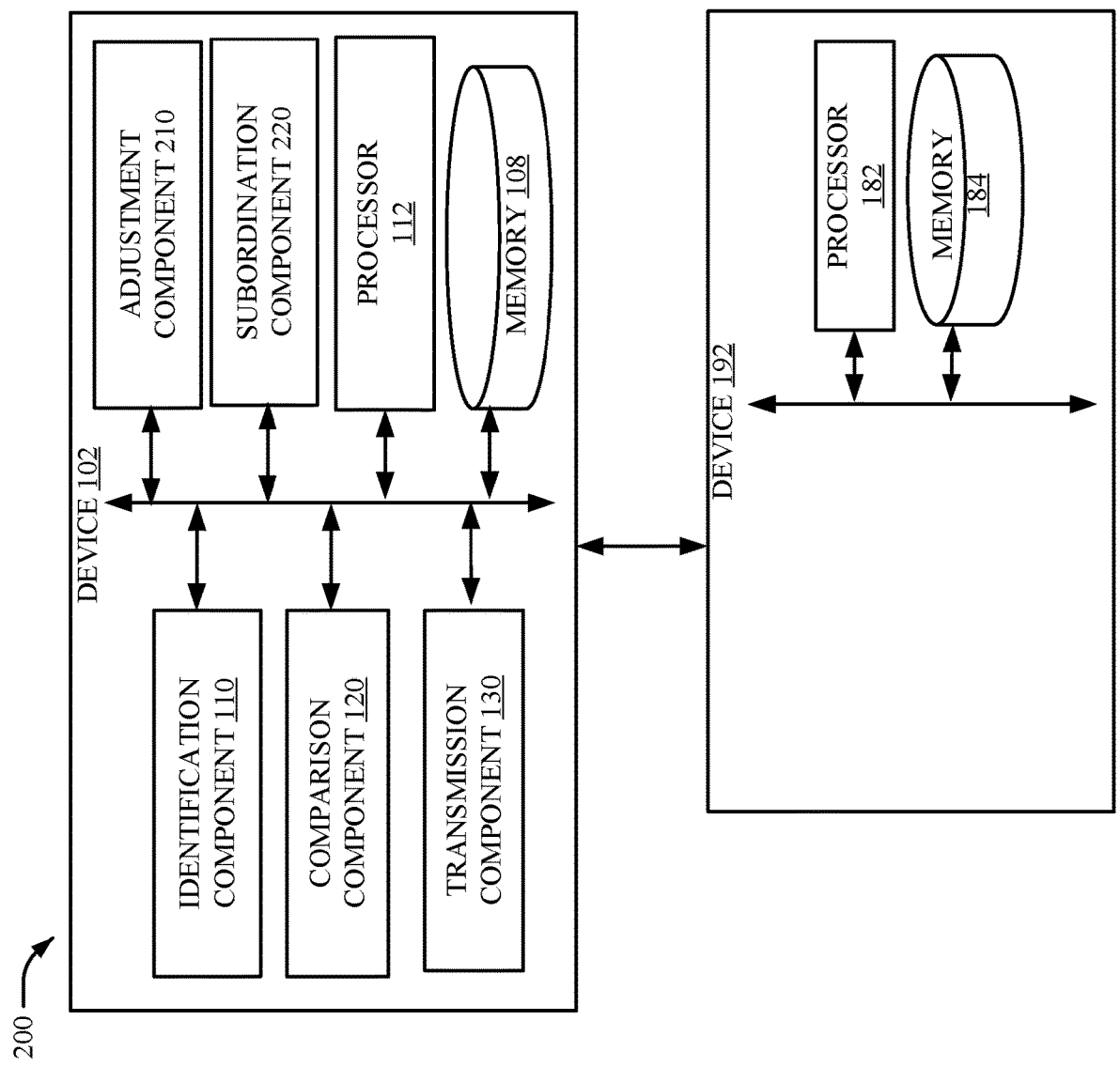
FIG. 2 illustrates a block diagram of an example, non-limiting system 200 that can facilitate a setup of a device in accordance with one or more embodiments described herein.

Turning now to FIG. 2, illustrated is a block diagram of an example, non-limiting system 200 that can facilitate a setup of a device in accordance with one or more embodiments described herein. Repetitive description of like elements employed in other embodiments described herein is omitted for sake of brevity.

In an aspect, system 200 can include all the components of system 100 but further employ an adjustment component 210 that adjusts a subset of policy data based on a set of user data associated with a master device 102. As such, policy data can be adjusted and implemented within device 192 at any time based on more efficiency mechanisms for operation of device 192 as well as patterns associated with better configurations or setup of device 192 and a user operation of device 192. In another aspect, system 100 or system 200 can implement block-chain technology to anonymize and store data such as policy data and device 192 use data at a central ledger that can't be changed or used by third party applications. In yet another aspect, system 100 or system 200 can access a neural network on device 102 such that all the determinations from data sets associated with device 192 are performed on device 102. In an aspect, each user or each device 102 can be connected to the same neural network. In yet another aspect, each device 102 can comprise its own encrypted container that provides access to a cloud computing environment. In an aspect, the cloud computing environment can be synchronized through the memory of device 102. Although, in one or more embodiments, device 102 does not need to access networked data (e.g., a cloud computing environment) from networked servers, device 102 can access networked servers for various applications. For instance, although device 102 comprises the data and components to classify device 192 information and data as well as perform setup operations of device 192, device 102 can access networked servers to obtain information such as update data or policy data (e.g., best practice policies) related to device 192.

Figure 3:
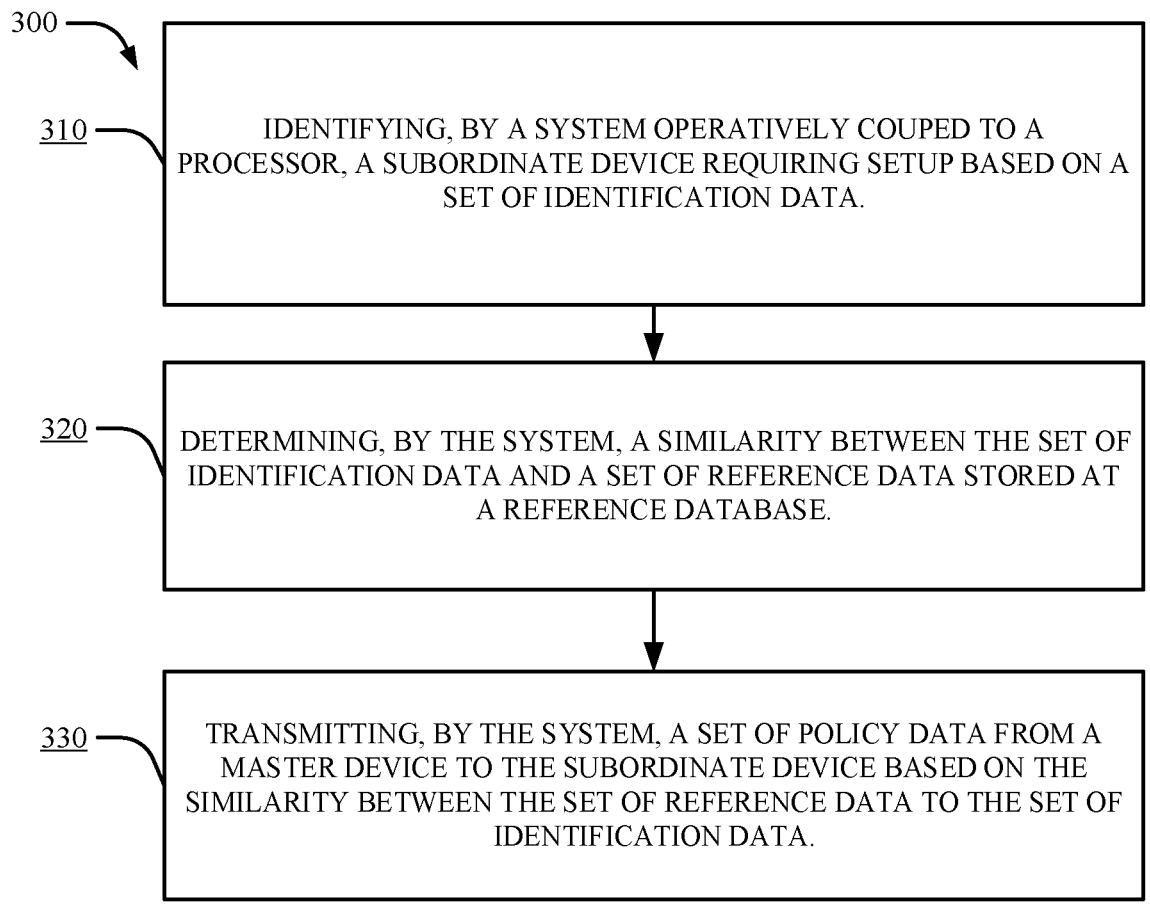
FIG. 3 illustrates a non-limiting embodiment depicting a method for facilitating a setup of a device in accordance with one or more embodiments described herein

In view of the example systems and/or devices described herein, example methods that can be implemented in accordance with the disclosed subject matter can be further appreciated with reference to flowcharts in FIG. 3. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states of events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 3 illustrates a flow chart of an example method 300 for facilitating a setup of a device in accordance with one or more embodiments described herein. At 302, the system operatively connected to a processor can identify a subordinate device requiring setup based on a set of identification data. At 304, the system can determine a similarity between the set of identification data and a set of reference data stored at a reference database. At 306, the system can transmit a set of policy data from a master device to the subordinate device based on the similarity between the set of reference data to the set of identification data.

Figure 4:
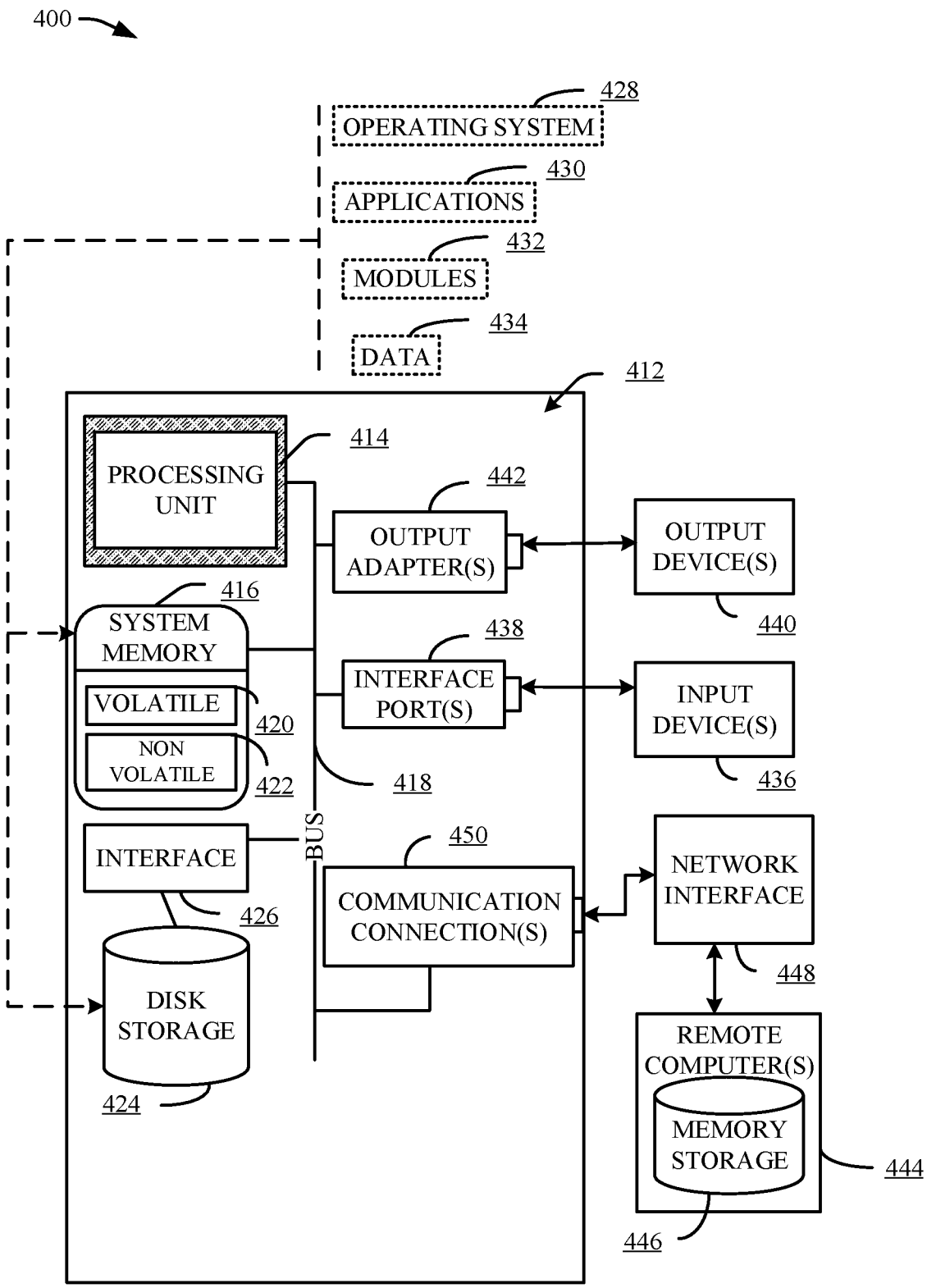
FIG. 4 illustrates a block diagram of an example, non-limiting operating environment 1600 in which one or more embodiments described herein can be facilitated.

In order to provide a context for the various aspects of the disclosed subject matter, FIG. 4 as well as the following discussion is intended to provide a general description of a suitable environment in which the various aspects of the disclosed subject matter can be implemented. FIG. 4 illustrates a block diagram of an example, non-limiting operating environment in which one or more embodiments described herein can be facilitated. With reference to FIG. 4, a suitable operating environment 400 for implementing various aspects of this disclosure can also include a computer 412. The computer 412 can also include a processing unit 414, a system memory 416, and a system bus 418. The system bus 418 couples system components including, but not limited to, the system memory 416 to the processing unit 414. The processing unit 414 can be any of various available processors. Dual microprocessors and other multiprocessor architectures also can be employed as the processing unit 414. The system bus 418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 416 can also include volatile memory 420 and nonvolatile memory 422. The basic input/output system (BIOS), containing the basic routines to transfer information between elements within the computer 412, such as during start-up, is stored in nonvolatile memory 422. By way of illustration, and not limitation, nonvolatile memory 422 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 420 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 412 can also include removable/non-removable, volatile/non-volatile computer storage media. FIG. 4 illustrates, for example, a disk storage 424. Disk storage 424 can also include, but is not limited to, devices like a magnetic disk drive, floppy disk drive, tape drive, Jaz drive, Zip drive, LS-100 drive, flash memory card, or memory stick. The disk storage 424 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 424 to the system bus 418, a removable or non-removable interface is typically used, such as interface 426. FIG. 4 also depicts software that acts as an intermediary between users and the basic computer resources described in the suitable operating environment 400. Such software can also include, for example, an operating system 428. Operating system 428, which can be stored on disk storage 424, acts to control and allocate resources of the computer 412.

System applications 430 take advantage of the management of resources by operating system 428 through program modules 432 and program data 434, e.g., stored either in system memory 416 or on disk storage 424. It is to be appreciated that this disclosure can be implemented with various operating systems or combinations of operating systems. A user enters commands or information into the computer 412 through input device(s) 436. Input devices 436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 414 through the system bus 418 via interface port(s) 438. Interface port(s) 438 include, for example, a serial port, a parallel port, a game port, and a universal serial bus (USB). Output device(s) 440 use some of the same type of ports as input device(s) 436. Thus, for example, a USB port can be used to provide input to computer 412, and to output information from computer 412 to an output device 440. Output adapter 1242 is provided to illustrate that there are some output device 440 like monitors, speakers, and printers, among other such output device 440, which require special adapters. The output adapters 442 include, by way of illustration and not limitation, video and sound cards that provide a means of connection between the output device 440 and the system bus 418. It should be noted that other devices and/or systems of devices provide both input and output capabilities such as remote computer(s) 444.

Computer 412 can operate in a networked environment using logical connections to one or more remote computers, such as remote computer(s) 444. The remote computer(s) 444 can be a computer, a server, a router, a network PC, a workstation, a microprocessor based appliance, a peer device or other common network node and the like, and typically can also include many or all of the elements described relative to computer 412. For purposes of brevity, only a memory storage device 446 is illustrated with remote computer(s) 444. Remote computer(s) 444 is logically connected to computer 412 through a network interface 448 and then physically connected via communication connection 450. Network interface 448 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 450 refers to the hardware/software employed to connect the network interface 448 to the system bus 418. While communication connection 450 is shown for illustrative clarity inside computer 412, it can also be external to computer 412. The hardware/software for connection to the network interface 448 can also include, for exemplary purposes only, internal and external technologies such as, modems including regular telephone grade modems, cable modems and DSL modems, ISDN adapters, and Ethernet cards.

Figure 5:
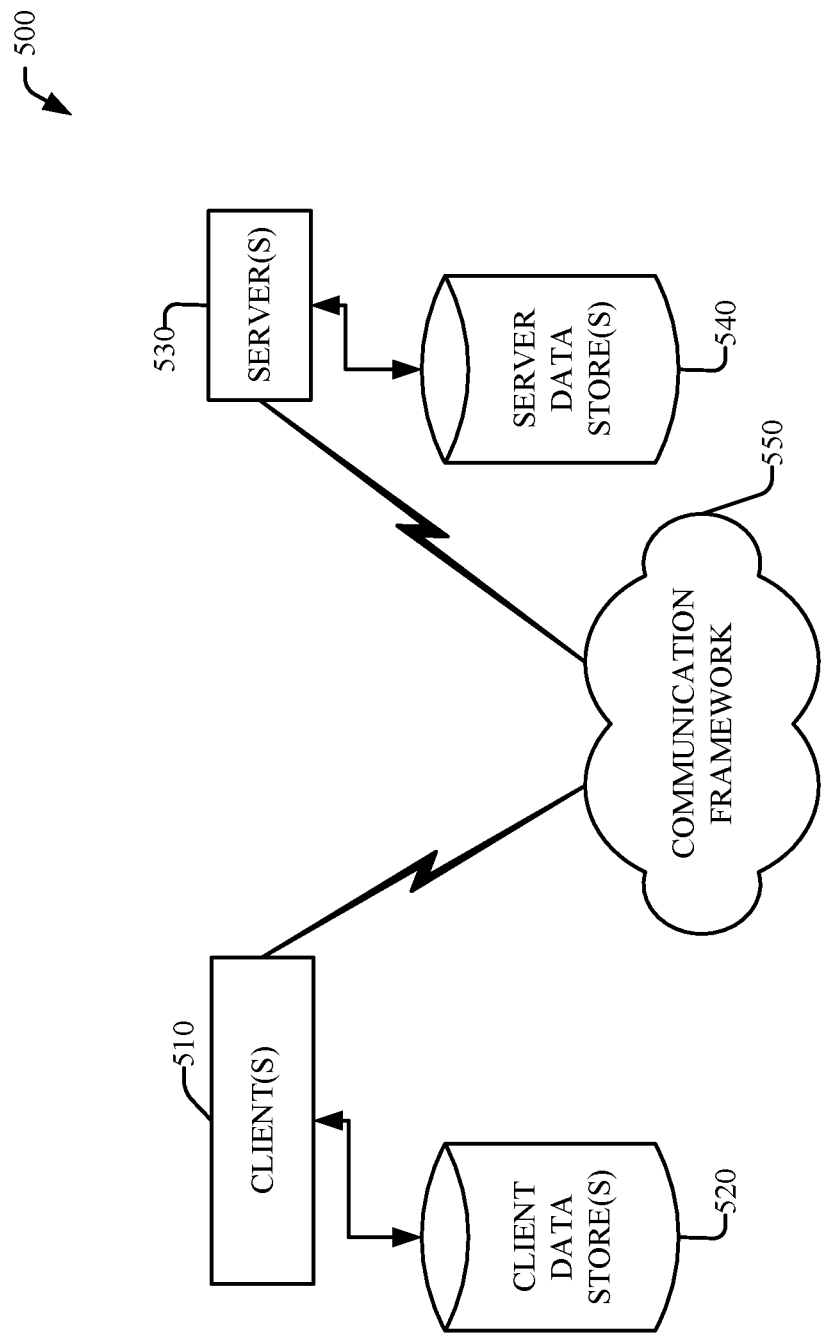
FIG. 5 illustrates a block diagram of an example, non-limiting operating environment 1700 in which one or more embodiments described herein can be facilitated.

Referring now to FIG. 5, there is illustrated a schematic block diagram of a computing environment 500 in accordance with this disclosure. Although, in one or more embodiment a networked environment is not necessary to access by device 102, in other embodiments, device 102 can access a networked environment (e.g., servers) to perform various activities and/or access particular data. The system 500 includes one or more client(s) 502 (e.g., laptops, smart phones, PDAs, media players, computers, portable electronic devices, tablets, and the like). The client(s) 502 can be hardware and/or software (e.g., threads, processes, computing devices). The system 500 also includes one or more server(s) 504. The server(s) 504 can also be hardware or hardware in combination with software (e.g., threads, processes, computing devices). The servers 504 can house threads to perform transformations by employing aspects of this disclosure, for example. One possible communication between a client 502 and a server 504 can be in the form of a data packet transmitted between two or more computer processes wherein the data packet may include video data. The data packet can include a metadata, e.g., associated contextual information, for example. The system 500 includes a communication framework 506 (e.g., a global communication network such as the Internet, or mobile network(s)) that can be employed to facilitate communications between the client(s) 502 and the server(s) 504.

Communications can be facilitated via a wired (including optical fiber) and/or wireless technology. The client(s) 502 include or are operatively connected to one or more client data store(s) 508 that can be employed to store information local to the client(s) 502 (e.g., associated contextual information). Similarly, the server(s) 504 are operatively include or are operatively connected to one or more server data store(s) 510 that can be employed to store information local to the servers 504. In one embodiment, a client 502 can transfer an encoded file, in accordance with the disclosed subject matter, to server 504. Server 504 can store the file, decode the file, or transmit the file to another client 502. It is to be appreciated, that a client 502 can also transfer uncompressed file to a server 504 and server 504 can compress the file in accordance with the disclosed subject matter. Likewise, server 504 can encode video information and transmit the information via communication framework 506 to one or more clients 502.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   one or more processors; and
   one or more storage devices comprising processor executable instructions that, responsive to execution by the one or more processors, cause the system to perform operations comprising:
   sourcing, by a user device configured to generate a multi-factorial identification record of a user corresponding to the user device, a set of digital DNA data comprising biometric data, transactional data, activity data and statistical data corresponding to a user from a set of data sources corresponding to a set of data feeds, wherein the user device represents a master device;
   receiving, by the user device, a set of identification data corresponding to a subordinate device based on a transmission technology;
   identifying, by the user device, that the subordinate device requires setup based on a determination that the set of identification data corresponds to the multi-factorial identification record and a device type;
   determining, by the user device, a similarity between the set of identification data and a set of reference data stored at a reference database; and
   transmitting, by the user device, a set of policy data and the multi-factorial identification record from the master device to the subordinate device based on the similarity between the set of reference data to the set of identification data, wherein the policy data represents setup configuration instructions of the subordinate device; and
   executing an automated configuration, by the user device, of the subordinate device based on the policy data and the multi-factorial identification record.

2. The system of claim 1, wherein the transmission technology is a radio frequency identification technology or near-field communication technology.

3. The system of claim 1, wherein the set of policy data represents at least one of best policy data, artificial intelligence generated data, or user selected policies.

4. The system of claim 1, wherein the operations further comprise adjusting a subset of policy data based on a set of user data associated with a master device.

5. The system of claim 4, wherein the operations further comprise transmitting an adjusted subset of policy data from the master device to the subordinate device.

6. The system of claim 1, wherein the operations further comprise subordinating the subordinate device to the master device, wherein the subordinate device is configured to receive the set of policy data from the master device.

7. The system of claim 1, wherein the user device is a wrist-wearable bracelet configured to generate the set of digital DNA data.

8. The system of claim 1, wherein the operations further comprise, transmitting, by the user device, transmission of the policy data to the subordinate device faster than a transmission of the policy data from a server network architecture.

9. The system of claim 1, wherein the operations further comprise encrypting, by the user device, the policy data transmitted from the user device to the subordinate device.

10. The system of claim 1, wherein the operations further comprise determining, by the user device, the similarity based on a threshold value corresponding to a level of similarity, wherein a similarity value below the threshold value represents an insufficient similarity, and wherein the similarity value threshold value greater than the threshold value represents a sufficient similarity.

11. The system of claim 1, wherein the operations further comprise permitting, by the user device, access to the subordinate device based on the set of policy data, wherein the access is based on subordinate device configuration terms and setting adjustments.

12. The system of claim 1, wherein the operations further comprise assigning, by the user device, permissive use rights or configuration rights of the subordinate device to a set of authorized users of the user device.

13. The system of claim 1, wherein the operations further comprise configuring, by the user device, the subordinate device with new policy data or adjustments to the policy data based on user device preferences.

14. The system of claim 1, wherein the operations further comprise configuring, by the user device, the subordinate device based on the policy data with at least one of a custom verification mechanisms, a subordinate device access mechanism based on the set of digital DNA data, or a subordinate device password-based access mechanism.

15. The system of claim 1, wherein the operations further comprise generating, by the user device, a set of subordinate device policy data based on patterns associated with the user device behavioral data, user device use data, and user device preferences.

16. The system of claim 1, wherein the operations further comprise selecting, by the user device, at least one user generated policy from a list of user generated policies to configure the subordinate device.

17. A method comprising:
sourcing, by a user device comprising at least one or more processor and configured to generate a multi-factorial identification record of a user corresponding to the user device, a set of digital DNA data comprising biometric data, transactional data, activity data and statistical data corresponding to a user from a set of data sources corresponding to a set of data feeds, wherein the user device represents a master device;

receiving, by the user device, a set of identification data corresponding to a subordinate device based on a transmission technology;

identifying, by the user device, that the subordinate device requires setup based on a determination that the set of identification data corresponds to the multi-factorial identification record and a device type;

determining, by the user device, a similarity between the set of identification data and a set of reference data stored at a reference database; and transmitting, by the user device, a set of policy data from the master device to the subordinate device based on the similarity between the set of reference data to the set of identification data, wherein the policy data represents setup configuration instructions of the subordinate device.

18. The method of claim 17, wherein the transmission technology is a radio frequency identification technology or near-field communication technology.

19. The method of claim 17, wherein the set of policy data represents at least one of best policy data, artificial intelligence generated data, or user selected policies.

20. The method of claim 17, wherein the operations further comprise adjusting a subset of policy data based on a set of user data associated with a master device.

* * * * *